(12) United States Patent
Badreddine et al.

(10) Patent No.: US 11,036,573 B2
(45) Date of Patent: Jun. 15, 2021

(54) CONTROL PROCESSOR UNIT (CPU) ERROR DETECTION BY ANOTHER CPU VIA COMMUNICATION BUS

(71) Applicant: Ford Global Technologies, LLC, Dearborn, MI (US)

(72) Inventors: Bader M. Badreddine, Dearborn Heights, MI (US); Matthew Allan Herrmann, Royal Oak, MI (US); Ahmad Hazime, Dearborn Heights, MI (US); Junghoon Kim, Ann Arbor, MI (US); Yuqing Tang, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 136 days.

(21) Appl. No.: 16/414,623

(22) Filed: May 16, 2019

(65) Prior Publication Data
US 2020/0364959 A1 Nov. 19, 2020

(51) Int. Cl.
*G06F 11/07* (2006.01)
*H04L 12/40* (2006.01)

(52) U.S. Cl.
CPC ...... *G06F 11/0757* (2013.01); *G06F 11/0739* (2013.01); *H04L 2012/40273* (2013.01)

(58) Field of Classification Search
CPC .............. G06F 11/0736; G06F 11/739; G06F 11/0754; G06F 11/757; G06F 11/76; G06F 11/0763; G06F 11/0766; G06F 11/0772; G06F 11/793; G06F 11/796; G06F 11/2028; G06F 11/3013; G05B 23/0289; G05B 23/0291; G05B 2219/24125; G05B 2219/25158; B60W 50/0205; B60W 2050/021; B60W 50/0225; B60W 50/029; B60W 2050/0292; B60W 2050/0295; B60W 2050/0297; B60W 50/035
See application file for complete search history.

(56) References Cited

U.S. PATENT DOCUMENTS

| 6,804,564 | B2 | 10/2004 | Crispin et al. |
| 7,418,316 | B2 | 8/2008 | Pfeufer et al. |
| 7,610,521 | B2 | 10/2009 | Kuramochi et al. |
| 2002/0198638 | A1* | 12/2002 | Haag ...................... B60T 8/885 |
| | | | 701/1 |
| 2005/0022060 | A1* | 1/2005 | Hashimoto ........ G05B 19/0428 |
| | | | 714/37 |

(Continued)

OTHER PUBLICATIONS

Wikipedia, "CAN bus", Nov. 8, 2018. (Year: 2018).*

*Primary Examiner* — Gabriel Chu
(74) *Attorney, Agent, or Firm* — David B. Kelley; Brooks Kushman P.C.

(57) ABSTRACT

A vehicle includes a first controller having a processor and a monitoring unit. The monitoring unit generates a question and transfers the question to the processor via a first bus. The processor generates an answer corresponding to the question and transfers the answer to the monitoring unit via the first bus. The processor transfers the question and the answer via a second bus. The vehicle includes a second controller coupled to the second bus and programmed to transition to a reduced performance mode responsive to the answer being different than an expected answer to the question.

19 Claims, 3 Drawing Sheets

(56) References Cited

U.S. PATENT DOCUMENTS

| | | | | |
|---|---|---|---|---|
| 2005/0268178 A1* | 12/2005 | Hagman | ............ | G05B 19/0428 |
| | | | | 714/47.1 |
| 2007/0016340 A1* | 1/2007 | Soudier | .................... | B60L 3/04 |
| | | | | 701/1 |
| 2009/0138137 A1* | 5/2009 | Iwagami | ............. | G06F 11/0739 |
| | | | | 701/1 |
| 2009/0312898 A1* | 12/2009 | Hashimoto | ........ | G05B 19/0428 |
| | | | | 701/29.1 |
| 2011/0257833 A1* | 10/2011 | Trush | .................. | G07C 5/0808 |
| | | | | 701/31.4 |
| 2014/0082434 A1* | 3/2014 | Knight | ................ | G06F 11/0739 |
| | | | | 714/55 |
| 2014/0149809 A1* | 5/2014 | Bisht | .................. | G06F 11/0739 |
| | | | | 714/55 |
| 2015/0095724 A1* | 4/2015 | Park | .................. | G05B 23/0221 |
| | | | | 714/55 |
| 2015/0213277 A1* | 7/2015 | Zhao | ....................... | G06F 21/44 |
| | | | | 713/189 |
| 2017/0147422 A1 | 5/2017 | Koktan | | |
| 2018/0150359 A1 | 5/2018 | Yamamoto | | |
| 2018/0231948 A1* | 8/2018 | Mori | .................. | G05B 23/0297 |
| 2018/0357118 A1* | 12/2018 | Jang | .................... | G06F 11/0724 |
| 2019/0079835 A1* | 3/2019 | You | .................... | G06F 11/0757 |
| 2019/0179693 A1* | 6/2019 | Kim | .................... | G06F 11/0757 |

\* cited by examiner

CONTROL PROCESSOR UNIT (CPU) ERROR DETECTION BY ANOTHER CPU VIA COMMUNICATION BUS

TECHNICAL FIELD

This application generally relates to detecting microprocessor errors and changing vehicle subsystem operation in response.

BACKGROUND

A vehicle may include subsystems that require coordinated operation of multiple controllers. To perform the features/functions of the subsystem, the controllers must be operating correctly. Various strategies exist for ensuring that a controller is operating correctly. A typical strategy may include a watchdog circuit that monitors processor operation. The watchdog circuit may be configured to receive a signal from the processor at periodic intervals. When the watchdog circuit does not receive the signal within a prescribed time, the watchdog circuit may output a signal that disables the controller. Such strategies may not adequately inform other controllers of the condition.

SUMMARY

A vehicle includes a first controller including a processor and a monitoring unit. The monitoring unit is programmed to periodically generate a question bit sequence having a predetermined answer bit sequence during a drive cycle. The processor is programmed to generate an answer bit sequence responsive to the question bit sequence. The vehicle includes a second controller programmed to, responsive to the answer bit sequence matching the predetermined answer bit sequence, operate a subsystem of the vehicle using output data from the first controller. The second controller is further programmed to, responsive to the answer bit sequence being different than the predetermined answer bit sequence, operate the subsystem disregarding the output data from the first controller.

The second controller may be further programmed to, responsive to the question bit sequence not changing for a predetermined amount of time, operate the subsystem disregarding the output data from the first controller. The monitoring unit and the processor may communicate via a serial peripheral interface (SPI) bus and the processor and the second controller may communicate via a controller area network (CAN) bus. The second controller may be further programmed to generate the predetermined answer bit sequence corresponding to the question bit sequence using a same algorithm as the processor. The second controller may be further programmed to, responsive to the answer bit sequence being different than the predetermined answer bit sequence, inhibit features of the subsystem that rely on output data received from the first controller. The monitoring unit may be further programmed to repeat the question bit sequence responsive to the processor generating the answer bit sequence that is different than the predetermined answer bit sequence. The monitoring unit may be further programmed to repeat the question bit sequence responsive to the processor not responding with the answer bit sequence within a predetermined time. The second controller may be further programmed to, responsive to the answer bit sequence being different than the predetermined answer bit sequence, operate the subsystem to inhibit features that output signals from second controller to the first controller.

A method includes generating, by a monitoring unit within a first controller, and periodically during a drive cycle, a question bit sequence having a predetermined answer bit sequence. The method further includes generating, by a processor within the first controller, an answer bit sequence responsive to the question bit sequence. The method includes operating, by a second controller, a subsystem of a vehicle using output data from the first controller responsive to the answer bit sequence matching the predetermined answer bit sequence. The method includes operating, by the second controller, the subsystem disregarding output data from the first controller responsive to the answer bit sequence being different than the predetermined answer bit sequence.

The method may further include repeating, by the monitoring unit, the question bit sequence with a same value responsive to the answer bit sequence being different than the predetermined answer bit sequence. The method may further include inhibiting, by the second controller, features of the subsystem that rely on output data received from the first controller responsive to the answer bit sequence being different than the predetermined answer bit sequence. The method may further include operating, by the second controller, the subsystem disregarding output data from the first controller responsive the question bit sequence being a same value for greater than a predetermined amount of time. The method may further include operating, by the second controller, the subsystem disregarding output data from the first controller responsive to not receiving a message that includes the question bit sequence and the answer bit sequence from the first controller for greater than a predetermined amount of time.

A vehicle includes a first controller programmed to receive, from a second controller that includes a processor and a monitoring unit in communication with the processor, a message that includes a question bit sequence generated by the monitoring unit and an answer bit sequence generated by the processor. The first controller is further programmed to generate a corresponding answer bit sequence to the question bit sequence. The first controller is further programmed to, responsive to the corresponding answer bit sequence matching the answer bit sequence that is received, operate a subsystem of the vehicle using output data from the first controller, and, responsive to the answer bit sequence that is received being different than the corresponding answer bit sequence, operate the subsystem in a reduced performance mode of operation.

The first controller may be further programmed to, responsive to receiving the message greater than a predetermined number of times without the question bit sequence changing, transition to the reduced performance mode. The first controller may be further programmed to store a diagnostic trouble code corresponding to the second controller responsive to the answer bit sequence being different than the corresponding answer bit sequence. The reduced performance mode may include inhibiting features that rely on signals received from the second controller. The reduced performance mode may include inhibiting features that rely on signals transferred to the second controller. The first controller may be further programmed to generate the corresponding answer bit sequence using a same algorithm as the second controller.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
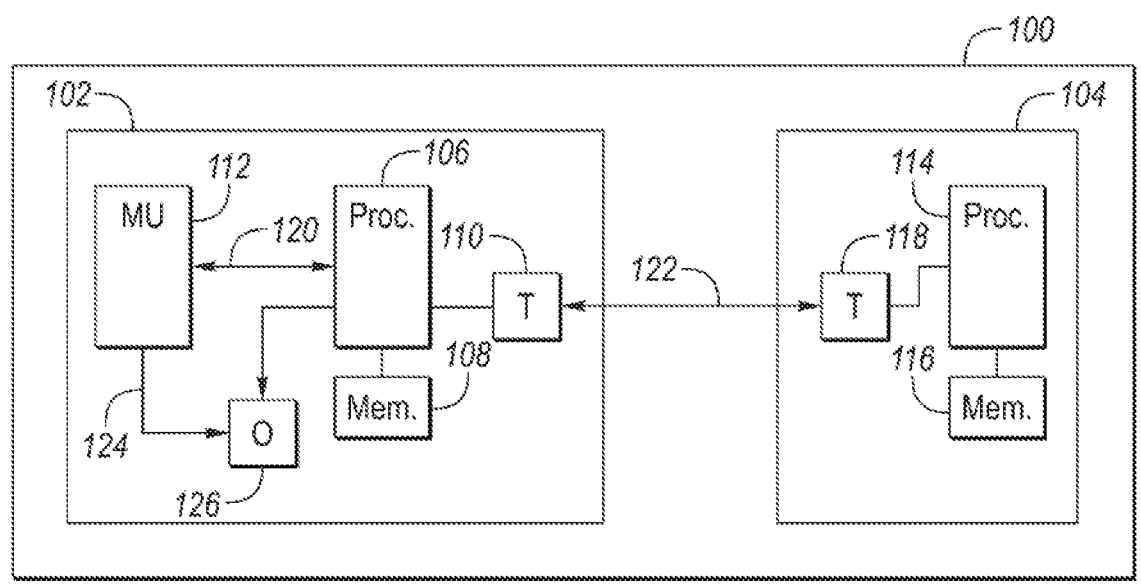
FIG. 1 depicts a block diagram of a possible arrangement of controllers in a vehicle.

FIG. 1 depicts a block diagram of a possible arrangement of controllers in a vehicle 100. The vehicle 100 may include a first controller 102. The first controller 102 may include a processing unit or processor 106. The processor 106 may be configured to execute programs and instructions. The first controller 102 may include a memory module 108. The memory module 108 may include volatile and non-volatile memory for storing data and instructions. The first controller 102 may include a monitoring unit 112. The first controller 102 may include output circuitry 126. The output circuitry 126 may be configured to provide outputs for controlling various vehicle features. For example, the output circuitry 126 may include drivers for controlling switching devices and/or relays. The processor 106 may provide signals to operate the output circuitry 126.

The monitoring unit 112 may be in communication with the processor 106 via a first communication bus 120. In some examples, the first communication bus 120 may be a Serial Peripheral Interface (SPI) bus. The monitoring unit 112 may include a processing unit and memory. The monitoring unit 112 may be programmed to verify that the processor 106 is executing properly. The processor 106 may be programmed to communicate with the monitoring unit 112 via the first communication bus 120. The monitoring unit 112 may be programmed to implement a question and answer strategy for determining the operational status of the processor 106. The monitoring unit 112 may output a disable or shutdown signal 124 that is configured to inhibit operation of the output circuitry 126.

The question and answer strategy may include the monitoring unit 112 generating a question. The question may be a bit sequence (e.g. question bit sequence) stored in one or more data bytes. Each question may have a predetermined or expected answer or response. The expected answer may be a bit sequence (e.g., answer bit sequence) stored in one or more data bytes. The monitoring unit 112 may transmit the question bit sequence via the first communication bus 120 to the processor 106. The processor 106 may receive the question and generate an answer based on the question bit sequence. For example, a lookup table that includes an answer for each possible question may be stored in the memory module 108. The processor 106 may index the lookup table using the question and retrieve the corresponding answer. Other examples may include defining a specific algorithm to process the question to generate the answer. The processor 106 may then send the answer via the first communication bus 120 to the monitoring unit 112. In some configurations, the monitoring unit 112 and the processor 106 may be programmed to implement similar control strategies. The monitoring unit 112 may generate the question as the input values to the control strategy. The processor 106 may generate the answer by providing the input values (from the question) to the control strategy.

The monitoring unit 112 may receive the answer from the processor 106. If the answer is not received within a predetermined time of sending the question, the monitoring unit 112 may suspect a problem with the processor 106 and may initiate appropriate actions. Upon receiving the answer within the predetermined time, the monitoring unit 112 may compare the answer to an expected answer. For example, the monitoring unit 112 may retrieve the expected answer from a lookup table or by executing a predetermined algorithm. If the answer and the expected answer do not match, then the monitoring unit 112 may suspect a problem with the processor 106. For example, program or data memory could be corrupted resulting in the processor 106 generating improper results. Responsive to the answer not matching the expected answer, the monitoring unit 112 may change the state of a shutdown signal 124. The shutdown signal 124 may cause the output circuitry 126 to override the signals from the processor 106. This may prevent the output circuitry 126 from responding to potentially unreliable signals received from the processor 106. Responsive to the mismatch between the answer and the expected answer, the monitoring unit 112 may subsequently send the same question to the processor 106. That is, the question is repeated when a mismatch or timeout is detected.

The first controller 102 may further include a transceiver 110 for communicating via a vehicle communication bus 122 (e.g., may be referred to as vehicle network). The vehicle communication bus 122 may be a Controller Area Network (CAN) bus and the transceiver 110 may be configured to communicate via CAN. Other configurations are possible for the vehicle communication bus 122 including a Local Interconnect Network (LIN) bus, a Media Oriented System Transport (MOST) bus, an Ethernet bus, or a FlexRay bus. The processor 106 may be programmed to communicate via the vehicle communication bus 122.

The vehicle 100 may include a second controller 104. The second controller 104 may include a processing unit 114 and a memory module 116. The second controller 104 may include a transceiver 118 for communicating via the vehicle communication bus 122. The first controller 102 and the second controller 104 may exchange messages via the vehicle communication bus 122 via a predetermined protocol. The second controller 104 may be programmed to operate a subsystem of the vehicle (e.g., braking subsystem, powertrain subsystem). As such, the second controller 104 may rely on data received from the first controller 102 to properly control and operate the subsystem. Further, the second controller 104 may rely on the first controller 102 responding properly (e.g., operating an actuator) to properly control and operate the subsystem.

The first controller 102 may be programmed to transmit the question and corresponding answer via the vehicle communication bus 122. For example, the communication protocol may define a message that includes the question and the corresponding answer. The second controller 104 may be programmed to receive the question and the corresponding answer. The first controller 102 may be programmed to initiate transmission of the message upon generating the answer to the question. The first controller 102 may be programmed to initiate the transmission over the vehicle communication bus 122 immediately prior to transferring the generated answer via the first communication bus 120.

Under normal operating conditions, the processor 106 generates an answer that matches the expected answer. The second controller 104 may receive the message including the question as received from the monitoring unit 112 and answer generated by the processor 106. The second controller 104 may be programmed to generate an expected answer to the question. Generation of the expected answer may be according to the same algorithm and/or lookup table used by the first controller 102 and the monitoring unit 112. The expected answer may be compared to the answer received from the first controller 102. If the expected answer is different than the received answer, the second controller 104 may suspect an operating problem with the first controller 102. As the question and answer data indicates a potential processing issue with the first controller 102, the data received from the first controller 102 may not be trusted. Responsive to the mismatch, the second controller 104 may implement measures to mitigate the expected loss of the first controller 102. Mitigating measures may include entering a reduced performance mode of operation. In the reduced performance mode of operation, the second controller 104 may inhibit features of the subsystem that rely on data received from the first controller 102. The second controller 104 may inhibit any features or functions of the subsystem that rely on control outputs of the first controller 102. For example, the second controller 104 may disregard subsequent output data and messages received from the first controller 102. Additionally, the second controller 104 may stop requesting control actions from the first controller 102. If the expected answer matches the received answer, the second controller 104 may continue to operate the subsystem using output data from the first controller 102.

The second controller 104 may be further programmed to monitor the question that is sent. Under normal conditions, the question should change periodically. If the question does not change periodically, then the second controller 104 may suspect a problem with the first controller 102. An unchanging question may be indicative of the monitoring unit 112 detecting an issue with the first controller 102. The unchanging question may also occur if the first controller 102 continues to send the same message over the vehicle communication bus 122 in the presence of a processor fault. The second controller 104 may operate the subsystem in the reduced performance mode responsive to the question not change for a predetermined amount of time.

The second controller 104 may be further programmed to store a diagnostic trouble code (DTC) to identify the issue with the first controller 102. This allows a service technician to diagnose the problem by retrieving the DTC from the second controller 104. The DTC may be associated with service instructions such as replacing the first controller 102. The second controller 104 may also cause a warning lamp or a warning message to be displayed on a vehicle display or panel to indicate that the vehicle may be operating in the reduced performance mode.

Additional controllers may include the described strategy of transmitting the question and answer over the vehicle communication bus 122. Controllers that provide critical sensor data to other controllers may implement the feature.

Figure 2:
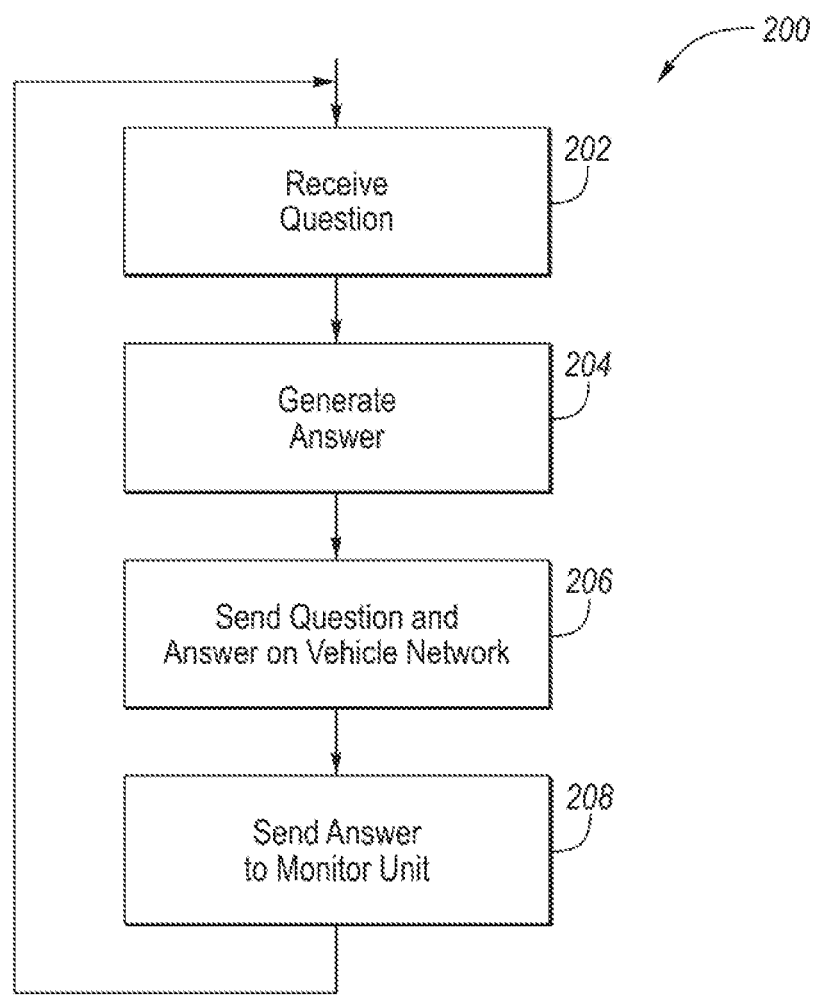
FIG. 2 depicts a flow chart of a possible sequence of operations for implementing a question and answer strategy in a controller.

FIG. 2 depicts a flow chart 200 for a possible sequence of operations that may be implemented in the processor 106 of the first controller 102. At operation 202, the processor 106 may receive a question from the monitoring unit 112. For example, the processor 106 may implement a driver for the first communication bus 120. At operation, 204, the processor 106 may process the question to generate an answer. For example, the processor 106 may index a table with the question to retrieve the answer or the processor 106 may implement an algorithm to process the question to result in the answer.

At operation 206, the processor 106 may send the question and the answer via the vehicle communication bus 122. For example, the processor 106 may populate a message buffer that includes the question and the answer and trigger sending of the message. At operation 208, the processor 106 may send the answer to the monitoring unit 112 via the first communication bus 120. The processor 106 may consider any timing requirements of the transmission. For example, the monitoring unit 112 may expect an answer within a predetermined amount of time of sending the question. The sequence of operations may then be repeated.

Figure 3:
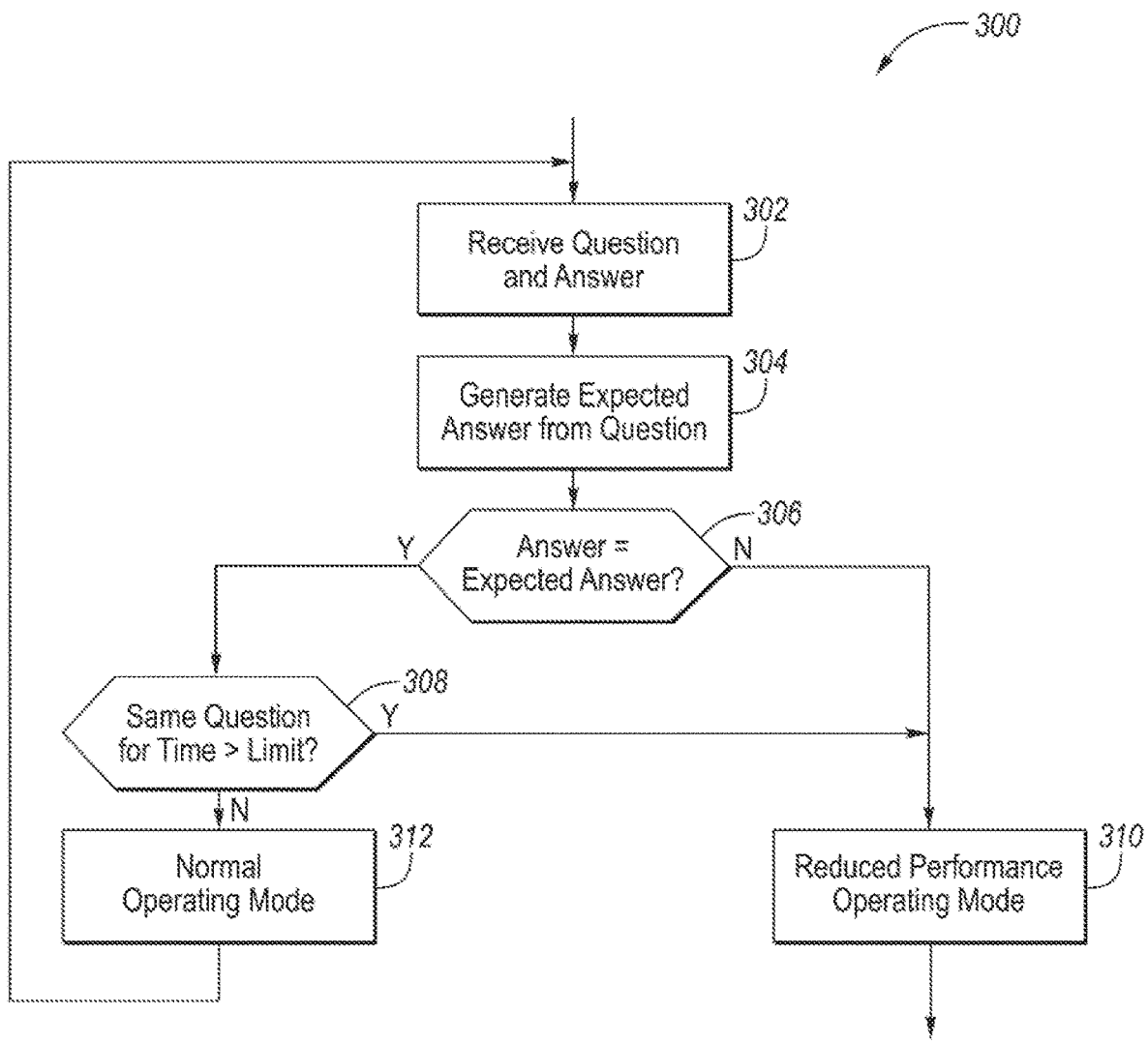
FIG. 3 depicts a flow chart for a possible sequence of operations for a monitor processor.

FIG. 3 depicts a flow chart 300 for a possible sequence of operations that may implemented in the processing unit 114 of the second controller 104. At operation 302, the second controller 104 may receive the question and answer from the first controller 102. At operation 304, the second controller 104 may generate the expected answer from the question that was received. For example, the second controller 104 may index a table with the question to retrieve the answer or the second controller 104 may implement an algorithm to process the question to result in the expected answer. The table or algorithm may be the same as that of the first controller 102 and/or the monitoring unit 112.

At operation 306, the answer received from the first controller 102 is compared to the answer generated by the second controller 104. It the answer differs from the expected answer, operation 310 may be performed. If the answer matches the expected answer, operation 308 may be performed. At operation 308, the second controller 104 may check if the same question has been received for a time interval that exceeds a predetermined time limit (e.g., 0.5 seconds). For example, the second controller 104 may maintain a count of a number of times that the question is received without changing and compare the number to a predetermined value. The count may be reset each time a new question is received. If the question has changed within the predetermined time limit, operation 312 may be performed. At operation 312, the second controller 104 may remain in a normal operating mode. If the second controller 104 remains in the normal operating mode, the sequence may be repeated. If the question has not changed within the predetermined time limit, operation 310 may be performed.

At operation 310, the second controller 104 may transition to the reduced performance operating mode. The reduced performance mode may include the second controller 104 disregarding subsequent messages received from the first controller 102. The reduced performance mode may include not updating values associated with message received from the first controller 102. The reduced performance mode may include the second controller 104 inhibiting features/functions that rely on signals from the first controller 102. The reduced performance mode may include the second controller 104 inhibiting features/functions that rely on signals sent/output to the first controller 102.

Figure 4:
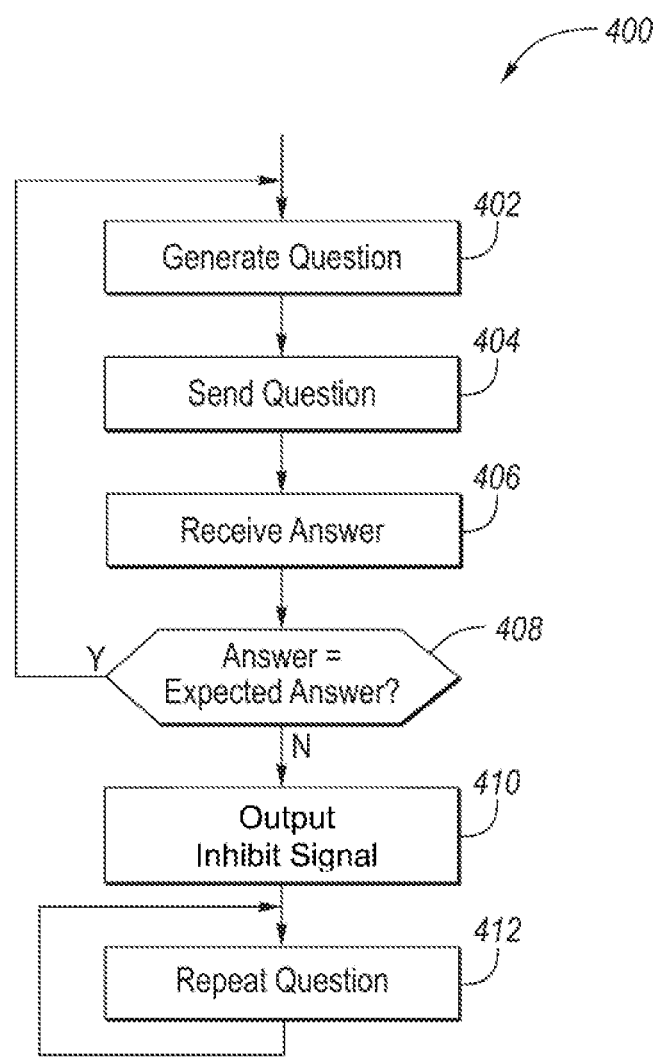
FIG. 4 depicts a flow chart for a possible sequence of operations for controllers in a network for implementing the question and answer strategy.

FIG. 4 depicts a flow chart 400 for a possible sequence of operations that may be implemented by the monitoring unit 112. At operation 402, the monitoring unit 112 may generate a question. The monitoring unit 112 may generate the question periodically during a drive cycle. A drive cycle may be initiated by activating an ignition or key switch to an on or run position. The drive cycle may be further defined as that time in which the subsystem is operating. The question may be randomly generated. The monitoring unit 112 may maintain a table of questions and corresponding answers. For example, the monitoring unit 112 may generate a question using a random number generator. The monitoring unit 112 may implement an algorithm for determining the corresponding answer.

At operation 404, the monitoring unit 112 may send the question via the first communication bus 120 to the processor 106. At operation 406, the monitoring unit 112 may receive the answer from the processor 106 via the first communication bus 120. At operation 408, the monitoring unit 112 may compare the received answer to the expected answer. The monitoring unit 112 may generate the expected answer using a table or an algorithm that may be the same as used by the processor 106. If the answer is the same as the expected answer, the sequence of operations may be repeated from operation 402.

If the answer does not match the expected answer, operation 410 may be performed. In some configurations, a single question and answer mismatch may be sufficient to detect the issue. In some configurations, multiple question and answer mismatches may be required to detect the issue. At operation 410, the monitoring unit 112 may output an inhibit signal. The inhibit signal may prevent the processor 106 from operating some of the hardware components. The inhibit signal may be configured so that communication via the vehicle communication bus 122 is still available to allow the question and answer to be transferred to the second controller 104. At operation 412, the monitoring unit 112 may repeat the question. For example, the monitoring unit 112 may continue to send the last question over the first communication bus 120. In some configurations, the first controller 102 may require a reset to return to normal operation. In other configurations, the first controller 102 may try to recover from the question and answer mismatch.

The monitoring strategy disclosed simplifies the controller hardware. The strategy can effectively ensure the reliability of communication over the vehicle communication bus 122. In the presence of a processor fault, other controllers are notified of the issue via the vehicle communication bus 122. The strategy further allows the other controllers to implement mitigation procedures to ensure safe operation of the vehicle functions and features.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a first controller including a processor and a monitoring unit,
the monitoring unit programmed to periodically generate during a drive cycle a question bit sequence having a predetermined answer bit sequence, and
the processor programmed to generate an answer bit sequence responsive to the question bit sequence; and
a second controller programmed to,
responsive to the answer bit sequence matching the predetermined answer bit sequence, operate a subsystem of the vehicle using output data from the first controller and,
responsive to the answer bit sequence being different than the predetermined answer bit sequence, operate the subsystem disregarding the output data from the first controller,
wherein the monitoring unit and the processor communicate via a serial peripheral interface (SPI) bus and the processor and the second controller communicate via a controller area network (CAN) bus.

2. The vehicle of claim 1 wherein the second controller is further programmed to, responsive to the question bit sequence not changing for a predetermined amount of time, operate the subsystem disregarding the output data from the first controller.

3. The vehicle of claim 1 wherein the second controller is programmed to generate the predetermined answer bit sequence corresponding to the question bit sequence using a same algorithm as the processor.

4. The vehicle of claim 1 wherein the second controller is further programmed to, responsive to the answer bit sequence being different than the predetermined answer bit sequence, inhibit features of the subsystem that rely on output data received from the first controller.

5. The vehicle of claim 1 wherein the monitoring unit is further programmed to repeat the question bit sequence responsive to the processor generating the answer bit sequence that is different than the predetermined answer bit sequence.

6. The vehicle of claim 1 wherein the monitoring unit is further programmed to repeat the question bit sequence responsive to the processor not responding with the answer bit sequence within a predetermined time.

7. The vehicle of claim 1 wherein the second controller is further programmed to, responsive to the answer bit sequence being different than the predetermined answer bit sequence, operate the subsystem to inhibit features that output signals from second controller to the first controller.

8. A vehicle comprising:
a first controller programmed to
receive, from a second controller that includes a processor and a monitoring unit in communication with the processor, a message that includes a question bit sequence generated by the monitoring unit and an answer bit sequence generated by the processor,
generate a corresponding answer bit sequence to the question bit sequence,
responsive to the corresponding answer bit sequence matching the answer bit sequence that is received, operate a subsystem of the vehicle using output data from the first controller, and
responsive to the answer bit sequence that is received being different than the corresponding answer bit sequence, operate the subsystem in a reduced performance mode of operation.

9. The vehicle of claim 8 wherein the first controller is further programmed to, responsive to receiving the message greater than a predetermined number of times without the question bit sequence changing, transition to the reduced performance mode.

10. The vehicle of claim 8 wherein the first controller is further programmed to store a diagnostic trouble code corresponding to the second controller responsive to the answer bit sequence being different than the corresponding answer bit sequence.

11. The vehicle of claim 8 wherein the reduced performance mode includes inhibiting features that rely on signals received from the second controller.

12. The vehicle of claim 8 wherein the reduced performance mode includes inhibiting features that rely on signals transferred to the second controller.

13. The vehicle of claim 8 wherein the first controller is further programmed to generate the corresponding answer bit sequence using a same algorithm as the second controller.

14. A vehicle comprising:
a first controller including a processor and a monitoring unit,
the monitoring unit programmed to periodically generate during a drive cycle a question bit sequence having a predetermined answer bit sequence, and
the processor programmed to generate an answer bit sequence responsive to the question bit sequence; and
a second controller programmed to,
responsive to the answer bit sequence matching the predetermined answer bit sequence, operate a subsystem of the vehicle using output data from the first controller and,
responsive to the answer bit sequence being different than the predetermined answer bit sequence, operate the subsystem disregarding the output data from the first controller, and
responsive to the answer bit sequence being different than the predetermined answer bit sequence, operate the subsystem to inhibit features that output signals from the second controller to the first controller.

15. The vehicle of claim 14 wherein the second controller is further programmed to, responsive to the question bit sequence not changing for a predetermined amount of time, operate the subsystem disregarding the output data from the first controller.

16. The vehicle of claim 14 wherein the monitoring unit and the processor communicate via a serial peripheral interface (SPI) bus and the processor and the second controller communicate via a controller area network (CAN) bus.

17. The vehicle of claim 14 wherein the second controller is programmed to generate the predetermined answer bit sequence corresponding to the question bit sequence using a same algorithm as the processor.

18. The vehicle of claim 14 wherein the second controller is further programmed to, responsive to the answer bit sequence being different than the predetermined answer bit sequence, inhibit features of the subsystem that rely on output data received from the first controller.

19. The vehicle of claim 14 wherein the monitoring unit is further programmed to repeat the question bit sequence responsive to the processor generating the answer bit sequence that is different than the predetermined answer bit sequence.

* * * * *